United States Patent
Barnert et al.

(12) 
(10) Patent No.: US 6,239,793 B1
(45) Date of Patent: May 29, 2001

(54) METHOD AND APPARATUS FOR SYNCHRONIZING THE BROADCAST CONTENT OF INTERACTIVE INTERNET-BASED PROGRAMS

(75) Inventors: Andrew Barnert, Hollywood; Kelly Byrd, Sherman Oaks, both of CA (US)

(73) Assignee: Rotor Communications Corporation, Hollywood, CA (US)

( * ) Notice: Subject to any disclaimer, the term of this patent is extended or adjusted under 35 U.S.C. 154(b) by 0 days.

(21) Appl. No.: 09/315,889

(22) Filed: May 20, 1999

(51) Int. Cl.[7] ................................... G06F 15/00
(52) U.S. Cl. ................ 345/302; 345/328; 709/203; 709/231
(58) Field of Search ................ 345/302; 709/203, 709/231

(56) References Cited

U.S. PATENT DOCUMENTS

| | | | |
|---|---|---|---|
| 5,526,407 | * | 6/1996 | Russell et al. .................. 345/302 |
| 5,655,117 | * | 8/1997 | Goldberg et al. ............... 707/102 |
| 5,828,403 | * | 10/1998 | DeRodeff et al. ................. 348/7 |
| 5,844,600 | | 12/1998 | Kerr ............................. 348/14.12 |
| 5,870,087 | | 2/1999 | Chau ............................. 345/302 |
| 5,903,264 | | 5/1999 | Moeller et al. ................. 345/327 |
| 5,905,981 | * | 5/1999 | Lawler .............................. 707/4 |
| 5,953,005 | * | 9/1999 | Liu ................................. 345/302 |
| 6,006,241 | * | 12/1999 | Purnaveja et al. ............... 707/512 |
| 6,018,764 | * | 1/2000 | Field et al. ..................... 709/217 |
| 6,041,345 | * | 3/2000 | Levi et al. ...................... 709/217 |
| 6,047,317 | | 4/2000 | Bisdikian et al. ............... 345/327 |
| 6,052,715 | * | 4/2000 | Fukui et al. ..................... 709/217 |
| 6,085,227 | * | 7/2000 | Edlund et al. ................... 709/203 |
| 6,151,632 | * | 11/2000 | Chaddha et al. ................. 709/231 |

OTHER PUBLICATIONS

Handling Audio and Video Streams in a Distributed Environment, Alan Jones, Andrew Hopper, 12/93.
Multipoint Audio and Video Control for Packet–Based Multimedia Conferencing, Fengmin Gong, MCNC Information Technologies, 10/94.

* cited by examiner

*Primary Examiner*—Heather R. Herndon
*Assistant Examiner*—Cong Lac Huynh
(74) *Attorney, Agent, or Firm*—Dickstein Shapiro Morin & Oshinsky LLP

(57) ABSTRACT

A method and system for synchronizing broadcast program content and corresponding program commands of an Internet-Based broadcast. The method (and system) generates a plurality of time-indicative index values during a broadcast of a program, associates ones of the plurality of index values with respective commands in a command stream launched during broadcast of the program, transmits the commands and associated index values to one or more clients, and associates ones of the plurality of index values to respective video frames in a video stream of the program to indicate the relative time within the program at which the video frame occurs. The method (and system) uses the index values in the video stream to determine the timing and sequence of execution of commands in the command stream at the one or more client.

20 Claims, 1 Drawing Sheet

Figure 1:
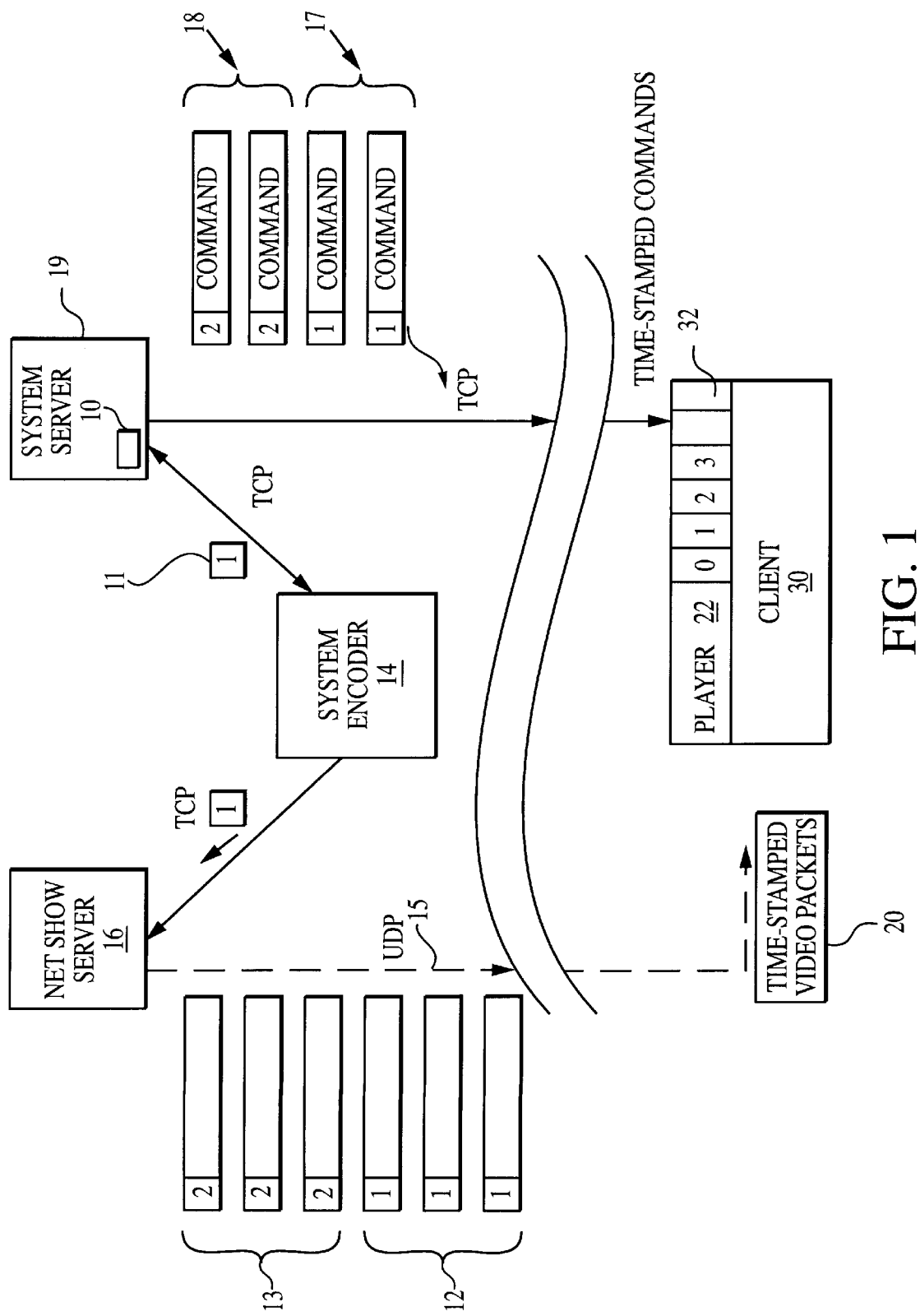

METHOD AND APPARATUS FOR SYNCHRONIZING THE BROADCAST CONTENT OF INTERACTIVE INTERNET-BASED PROGRAMS

BACKGROUND OF THE INVENTION

1. Field of the Invention

This invention relates to interactive, Internet-based, program production systems capable of producing live interactive classroom instruction, live interactive entertainment-type shows, pre-recorded interactive programs, and the like. As will become apparent, the type of program content is unlimited, and it is foreseeable that the content can be at least the same as an interactive version of anything currently found on television, albeit Internet based.

For convenience, this disclosure will describe the production system in terms relevant to classroom and/or entertainment programming. Unless the context indicates otherwise, the term "commentator" will be used to denote the classroom instructor, the entertainment program's host and/or other persons being viewed at the moment by the viewer; "client" will denote the viewer's computer system, including hardware and software; "server" will denote the computer(s) (including hardware and software) which deliver the program content to the client, and "viewer" will refer to the person(s) at the client end of the system.

2. Description of the Prior Art

It will be assumed that the reader is familiar with basic Internet technology. To the extent that explanatory information is required, the reader is referred to *How The Internet Works* by Preston Galla (1997, Ziff-Davis Press) and *Computer Networks and Internets* by Douglas Comer (Second Edition, 1999; Prentice-Hall, Inc.), the contents of which are hereby incorporated by reference.

The production of Internet-based program content can be thought of as consisting of two types of signals: (1) the audio and video content of the program itself (hereinafter, the "A/V content") and (2) commands. Examples of these signals are described below.

The A/V content is typically sent over the Internet as streaming video and streaming audio. Because audio and video content contain a large amount of information, streaming techniques typically compress the content, and transmit the compressed content to the client in IP packets using UDP protocol. Unlike the TCP protocol typically used to transmit text, UDP does not constantly check to see if data has been received by the client, and does not resend packets if they are lost in the course of transmission to the client. The loss of video information (e.g., an occasional frame) or audio information is acceptable and is frequently minimally detectable by the viewer.

UDP is far superior to TCP for A/V streams. While neither the UDP nor TCP protocols guarantee that data will arrive at a steady rate, UDP will statistically hit that rate more often for the very reason that it does not hold earlier packets while later packets are resent and placed in order. For this reason, UDP represents a more efficient way to transmit A/V content than TCP because it does not use otherwise-needed bandwidth to recover essentially non-essential packets that have been dropped or garbled, and it need not acknowledge receipt of successfully transmitted packets.

The audio packets and video packets received by the client are stored in respective buffers. When the buffers fill, or reach some other predetermined condition, an audio player and a video player are launched within the viewer's computer, and A/V content can be watched and heard while later packets are being delivered.

The foregoing descriptions of streaming audio and video signals are exemplary only, and are not intended to limit the scope of the invention in any way.

The aforementioned commands are signals which tell the system to launch such features as poll, chat, and talk-back and are known, per se, in Internet-based broadcast system technology. Poll typically launches one or more text-based questions, with a choice of answers for each question, and is a way to gather information about viewers' tastes, opinions, knowledge, etc. Chat provides the viewer with a way to interact with other viewers. Talk-back permits the viewer to send questions and comments directly to the commentator. Other features are known as well, and this list is intended to be exemplary only. Those skilled in the art will recognize that the number and type of command-initiated features are incidental to the subject invention, and that other commands and analogous signals may utilize the methodology described herein. The scope of the invention is accordingly not to be construed as being limited to these specifically described features.

As the program content is created as part of the interactive presentation, the content's producer launches commands, such as poll, with the intent that the viewer see the poll questions and answer-buttons at a particular point in the presentation. If the commands are not executed in sync with the A/V content, the presentation becomes confusing and, in some cases, meaningless. In the case of a poll, for example, explanations and instructions provided to the viewer within the A/V content must be presented at or near the time the poll is launched on the viewer's screen if the viewer is to understand and act pursuant to the commentator's instructions.

SUMMARY OF THE INVENTION

This invention is concerned with the delays associated with Internet-based transmission of video, and the resulting loss of synchronization between the video-based content and program features such as commands. The delay experienced when A/V content is sent from the server to the client over the Internet is not under the control of the program producer. There is typically, for example, approximately 3 seconds of delay at the client while the client's video buffer gathers the video stream, rebuffers the incoming data as missing packets arrive, decodes the packets, etc. Moreover, the delay is a function of the transmission path, which itself can vary from packet to packet.

At the server, live broadcasts impose additional delays because each video frame must be converted to digital data, processed, compressed and encoded. Moreover, typical compression techniques require that a set of sequential video frames be compared for differences so that data concerning the differences need only be transmitted, and the need to await subsequent frame information contributes substantially to the delay. Server-side delay can range as high as 20 seconds with present technology, compared to 2 seconds for audio and a fraction of a second for simple commands. Even at best, there is about a 7–8 second discrepancy, which is more than enough to cause the lack of synchronization to become significant.

One method for synchronizing commands with the A/V content is to "piggyback" the commands into the "out-of-band" channel provided by such currently available streaming video systems as RealNetwork's RealPlayer™ and Microsoft's NetShow™ (It is currently understood that Microsoft may be changing the name "NetShow" to "Windows Media Services" for the server side, and to "Windows Media Player" for the client side).

Currently, the "out-of-band" channel is used to open URL's at specified times by encoding the website address into the videostream so that the client's browser opens the website at the appropriate time. Information concerning NetShow is currently found at Microsoft's website http://www.microsoft.com, and one can search future Microsoft websites of such keywords as "streaming", "netshow", or "media player" to obtain the information if the site changes.

The current site containing information is http://www.microsoft.com/windows/windowsmedia/. The technical support site is http://www.microsoft.com/windows/windowsmedia/Support/default asp. The Windows Media Player Software Development Kit page is http://www.microsoft.com/directx/dxm/help/mmp_sdk/c-frame.htm# default.htm, which includes the documentation for the Media Player Active Control here. The associated links from this page also have useful information helpful to software developers. Http://www.microsoft.com/directx/dxm/help/mmp_sdk/reference/mediaplayercontrolreference.htm is part of the above mentioned site, and includes a set of links to all the lower-level developer information concerning the features of the Media Player ActiveX control.

RealPlayer is a product of RealNetworks, whose website is "http://www.real.com". The developers' site for RealNetworks' software is http://www.real.com/devzone,while RealNetworks' ActiveX control reference is found at http://service.real.com/help/library/guides/extend/embed.htm and its Software Development Kit page is http://www.real.com/devzone/library/creating/rmsdk/index. html.

The "out of band" channel can thus be used to launch a quiz, launch a projector, etc. An advantage to this method is that the streaming video system (preferably NetShow) automatically syncs the command with the appropriate moment in the video stream. However, there are a number of technical obstacles which make this approach non-preferable.

First, the required format for data placed in these "out-of-band" channels differs among different software implementations (e.g., Netshow vs. RealNetworks). Moreover, the format allowed in any implementation is very limited and constricting in any event, requiring the entire protocol of each command to be force-fit within the particular constraints specific to the streaming technology to be used (e.g., RealNetworks, Netshow, etc.).

Second, the more data sent down the out-of-band channel, the busier the system components such as the encoder, A/V server, and A/V player. These components are already busy performing the tasks associated with conventional A/V broadcasting, and the increased burden imposed with the addition of the many command-related tasks is highly disfavored. A quiz, for example, includes a great quantity of text together with a need to acquire and tabulate the viewers' responses to the quiz questions. The launching of a quiz accordingly imposes a number of added tasks on the system within the time constraints permitted for effective operation.

Third, encoding the command into the video stream is disfavored because the UDP protocol does not check to see if data has been received by the client, and does not resend packets if they are lost in the course of transmission to the client. While the loss of video information or audio information is acceptable, the loss of a packet containing a command has far more serious consequences. While UDP is good for loss-tolerant, high-bandwidth, timing-critical data, it is not preferred for such loss-intolerant data as commands.

The A/V stream is loss-tolerant in the sense that a small number of dropped, garbled, or out-of-order frames will usually not be noticeable to the user. It is timing-critical in the sense that audio samples arriving twice as close together at the client as they were on the server will produce a sped-up effect or, worse, a "chipmunk" effect. While many A/V players can handle this problem with suitable buffering, longer buffering periods mean additional work for the system components and longer delays in presentation of the A/V content.

Commands, on the other hand, are loss-intolerant because the loss can dramatically affect the presentation of the production. For example, a feature which the viewer needs or wants may not be launched by the client's player, or may be launched by the player at the wrong time. Even more importantly, dropped commands can cause the client to receive and interpret seemingly meaningless data, making the entire system unstable. The commands must arrive reliably. A single dropped, garbled, or truncated command can cause disastrous results. If the player receives half a command, for example, it may interpret what is essentially random garbage as an arbitrary command.

There are numerous ways to handle this problem using the "piggyback" method, but all have drawbacks. First, the server could send "key frames," like the A/V stream, updating the player on the current state of the entire application every few seconds. However, this would be a massive waste of bandwidth, since there may be only a few hundred bytes of new data/second, but a few hundred kilobytes of data needed to describe the entire current state.

Alternatively, the server could include a mechanism to track each player's acknowledgement of each command and resend un-acknowledged commands (and vice-versa). However, this would impose a tremendous amount of extra work on the system components, and any application-level implementation has the potential for being error-prone and inefficient.

Internet-based systems are known to lose data during transmission because IP packets do not arrive, or arrive greatly out of sequence. The piggyback method accordingly provides inherent synchronization, but with a loss of reliability.

The preferred method and system disclosed herein advantageously utilizes the UDP protocol for A/V content and the TCP protocol for broadcast of the commands and synchronizes the command with the A/V content at the client's end for meaningful presentation. As described above, TCP is far superior to UDP for the command stream because it provides for the detection and retransmission of missing or garbled packets. In addition, TCP also provides other benefits such as detection of disconnection.

The preferred system operates by generating a time line as the program content is created. The time line comprises a series of index values ("time stamps") which changes periodically. By way of illustration, and not limitation, a time stamp of "1" is generated during the first second of the program, a time stamp of "2" between the first and second second of the program, etc.

Preferably, the interval of time between time-stamp changes is a constant, and the value of the time stamp is sequentially incremented at the end of each interval. Those skilled in the art will recognize, however, that both the time intervals and the values assigned to the time stamps can be changed and varied in any of numerous ways without departing from the scope of the invention, so long as correlation of the index value with the A/V content is possible.

Briefly, the time stamps are piggybacked by the disclosed system onto the video stream using, for example, NetShow's out-of-band channel. Thus, each portion of the A/V content is identified by a time stamp representative of the portion's relative place within the program. Those skilled in the art will recognize that the time stamps, themselves, require very little bandwidth and accordingly do not unduly interfere with the amount of bandwidth available for video content.

The commands are labeled with the time stamp in effect at the time the command is launched, and the time-stamped command is transmitted to the client(s) using the TCP protocol. In addition to avoiding the imposition of additional bandwidth limitations on the A/V signal, use of the TCP protocol assures that missing packets will be detected and re-sent and that all commands will likely be received by the client(s).

The TCP commands typically arrive ahead of the UDP A/V content, and the commands are accordingly held in memory pending receipt of the related portion of A/V content. The time stamp of each command is used to correlate it with the point in the A/V content at which the command is to be executed by the client, using the time-stamps carried by the A/V content as the key.

The invention herein accordingly includes (1) generating time-indicative index values during the creation of an Internet-based program to be transmitted by a server producing a stream of commands (which may be conventional TCP commands) launched during the program, (2) piggybacking the index values onto the commands within the stream so that the index values are indicative of where in the program the command was launched, (3) transmitting the command stream and associated index values via the TCP connection to the client(s), (4) storing the time-stamped commands at the client, (5) tagging the index values to the video frames in the video stream to indicate the relative time within the program at which the video frame occurs, and (6) using the index values in the video stream to determine the timing and sequence of command execution at the client(s).

DESCRIPTION OF THE PREFERRED EMBODIMENT

FIG. 1 schematically illustrates the time-stamping of the A/V content in accordance with the invention. In FIG. 1, a series of UDP packets 12 are illustrated, representing the first few frames of A/V content of a live interactive broadcast in accordance with the invention. A periodically incrementing counter or timer 10 at the server generates an index value to be used to time-stamp the video packets and command signals. In practice, a period of 1 second or one-half second between incrementations appears suitable. At the end of each period, the timer sends out the current stamp value, and increments to the next stamp value.

3. The A/V Content

Assuming for the sake of simplicity that the time stamp is to be incremented once each second, all video packets 12 pertaining to the first second of program content include a time stamp of "1", video packets 13 pertaining to the second second of content include the time stamp "2", etc. This is preferably accomplished using Microsoft's Netshow's ScriptCommand to piggyback the then-effective value of the time-stamp into the video packets.

NetShow's ScriptCommands are described at http://www.microsoft.com/directx/dxm/help/mmp_sdk/overview/Embedded_Script_commands.htm.

A broadcast system encoder 14 sends the appropriate time-stamp value to the NetShow server 16 as a script command using the TCP protocol. As the A/V content is created or recorded, the NetShow server 16 tags the video packets with the appropriate time stamp, as it would do with any conventional script command.

For reasons which will be explained below, the broadcast encoder 14 preferably receives the correct time stamp value from the counter 10 just before the counter increments to the next value. For example, the counter 10 sent a value of "1" to the encoder 14 just before it incremented to "2", and will send a time-stamp value of "2" to the encoder 14 just before it increments to "3", etc.

When the encoder 14 receives a time stamp value from the counter 10, it sends that value to the NetShow server 16 as a script command until a new value is received from the counter 10. The NetShow server 16, in turn, sends the value as part of the UDP signal to the client just as it would any conventional script command. The time-stamped video is then transmitted over the Internet to the client(s) as part of an Internet-based broadcast. Those skilled in the art will recognize that although video packets are currently typically sent using the conventional UDP protocol, other protocols can be used without departing from the scope of the invention.

Because each packet of video content arriving at the client is stamped with an time-stamp index value indicative of the time within the program at which the data within the packet was created, the stage has been set to permit the launching of commanded features at the desired instances during the program.

Before proceeding further, it should be noted that those skilled in the art know that the term "script command" is a term used by NetShow to describe a particular feature, and that term is being used here because the described embodiment uses that streamer. Those skilled in the art will recognize that other streaming software can be used to practice the invention disclosed herein, and that these other products may use different terms and analogous mechanisms. Other streaming software products currently include, but are not limited to, RealPlayer, QuickTime Live, and "raw" RTP/RTSP streamers such as Darwin, and it can be expected that other streamers will become available with time. Documentation for the foregoing software frequently use terms such as "data channel" in lieu of "script command", or simply instruct the user to create a separate channel or to send out-of-band data. Regardless of the specific term used, the analogous function of the particular streamer chosen can be used to accomplish the task consistent with description herein, and these alternatives are included within the scope of the invention as well.

Likewise, those skilled in the art will recognize that it may be the streaming encoder which adds the piggybacked values or, in other cases, the streaming server will do it but will receive the time-stamp from the encoder. In still other cases, the streaming server will receive the time-stamp directly from the broadcast system's server, and in some cases the streaming system may not delineate a clear distinction between the encoder and the server. Nevertheless, all of these variations are known in the art and within the scope of the invention described herein.

4. The Commands

As commands are generated by the program's production staff during the show, the value of the then-effective time stamp is attached to the command signal as an application-level header, thereby correlating the issuance of the command signal with the point within the program at which the command was generated; i.e., commands 17 having the stamp "1" were created during the first second of program content, commands 18 having the stamp "2" were created during the second second of program content, etc.

The time-stamped commands 17, 18 are sent by the system server 19 to the client(s) 30 using the TCP protocol. The time-stamped commands typically arrive at the client(s) ahead of the video because of the inherent delays in broadcasting, receiving and displaying video described above.

Upon receipt by each client, the commands are held in a buffer 32. By way of illustration, commands with a time-stamp of "1" are held in buffer "1", those with time-stamp "2" in buffer "2", etc.

5. The Client

The A/V stream 15 is received by the client's player 22 as any other stream received by a NetShow player. The TCP time-stamped commands 20 are also received by the client.

As, for example, commands bearing the time stamp "1" are received, they are stored in queue in buffer "1" pending receipt of A/V content bearing a "1" script command. Commands bearing a time stamp value of "2" are stored in queue in a "2" buffer pending receipt of A/V content bearing a "2" script command, etc.

As video is received by the client, the piggybacked time-stamp values (in the form of script commands) are received as well. Using a NetShow feature known as ActiveX, the system has been configured to alert the client when a script command is received by registering such arrivals as an ActiveX "event". ScriptCommand events are described by Microsoft at http://www.microsoft.com/directx/dxm/help/mmp_sdk/reference/events/event_ScriptCommand.htm. Upon notification that video with a given time-stamp value has been received, the stored commands associated with that time stamp value are retrieved from the buffer holding the commands from that time period. For example, as video packets indexed with the time-stamp "1" are displayed, buffer "1" is accessed, with any and all commands stored therein being executed in queue in the order received.

Preferably, all buffers for holding commands with an earlier time-stamp are accessed first (in time-stamp order) to minimize the risk that a dropped UDP packet will result in a dropped command. For example, commands which should have been executed during time period "0", but were not owing to the non-arrival of "0" video packets will be executed prior to "1" commands. During the "2" period, the "0" buffers are accessed for unexecuted "0" commands, then the "1" buffers for unexecuted "1" commands, and then the "2" buffers. Commands associated with earlier time periods are accordingly launched, in order of time-stamp, as soon as possible throughout the program. In reality, the time periods are sufficiently short so that any belated execution is unnoticeable or barely noticeable to the viewer.

In the unlikely event of a late-arriving TCP packet, any late-arriving command will also be launched in this manner as soon as possible. Because of the way TCP works, all later TCP packets will be held up waiting for the late packet, and will subsequentally all execute in order until the system is "caught up" to the time sync.

6. Preferred Time Stamp Criteria

In practice, it is also desirable to minimize the number of bytes to be allocated to the time-stamp value carried by the A/V stream, and thereby maximize the bandwidth available for carrying the audio and video information. Preferably, only two bytes are allocated for time-stamp values, yielding a maximum of 65,536 time-stamp values. However, because the "0" value is treated differently, as explained below, the use of two bytes will yield 65,535 time-stamp values.

The elapsed time to fill positions 0–65,535 is just over 18 hours if the time-stamp value is incremented once each second, and just over 9 hours if the time stamp is incremented every half second. Since most productions are substantially shorter than this, two bytes is quite sufficient. For unusual situations the time-stamp value, and accessed buffers, can simply be rolled over to "0" following 65,535 since sufficient time will have elapsed to ensure that all video and commands previously stamped with a "0" have long since been received and utilized.

The client's buffer may accordingly be a circular buffer, wherein incoming time-stamped commands are stored in the appropriate location among locations "0" through "65,535". For added reliability, however, means are included for differentiating between time-stamp of the same value which were generated during different cycles, thus enabling the client to determine whether "0" was really "0", or whether it is the equivalent of time stamp "65,536".

When the program first starts, the assumption is that all time stamps from "0"–"32,767" are recent, and those stamped "32,768"–"65,535" are earlier in time (i.e., the prior cycle). Once "32,768" is reached, the assumption is made that those stamped "32,768"–"65,535" are recent, and those stamped "0"–"32,767" are earlier in time. Once there is a rollover from "65,535" to "0", the assumption is switched once again. Thereafter, every time either "0" or "32768" is crossed, the assumption is switched.

In order to recognize when a boundary has been crossed, and the assumption should be switched, it is preferably presumed that two time-stamps which are 16,384 units apart will not follow each other—or, if they do, the next time-stamp will correct the problem. Thus, the crossing of "0" or "32,768" by less than 16,384 will switch the assumption as to which time stamps are earlier and which are current.

Thus, the receipt of a time stamp of from "1"–"16,383" will cause the system to assume that any time-stamps received with a value of "32,768"–"65,535" were generated earlier than time stamps labeled "0"–"32,767". Whenever a time-stamp is received having a value of "32,768"–"49,151", the system assumes that time stamps with values of "0"–"32,767" were generated earlier than time stamps "32,768"–"65,535".

Because some software, such as NetShow, may interpret a "0" as signifying the end of a string, time stamps having a "0" may require some additional encoding to prevent incorrect interpretation of the value of a time-stamp. For example, NetShow may interpret the "0" in time stamp "23705" as signifying the end of a string, and may accordingly interpret the time stamp as "237". The additional encoding can conveniently be performed prior to sending the value to the broadcast system encoder, preferably by mapping all zeros within the time stamp value to a predetermined two-byte number, with the resulting value transmitted to the system encoder. If the transmitted time-stamp value contains an extra number of bytes, the client accordingly recognizes the number as a converted number containing a zero.

There are a number of encoding methods which can be employed. The simplest solution is to send the time-stamps as strings instead of as raw data, but this would mean that 16-bit time-stamps could take an average of four to five bytes instead of two (e.g., the number 16384 takes five bytes to send as a string, but it fits in two bytes in binary representation).

Another solution is to use a modified version of "binary-coded decimal," or BCD. In BCD, two decimal digits are packed into each byte; e.g., 16,384 in BCD would be made up of the hexadecimal bytes 01 63 84. However, standard BCD would not solve the problem satisfactorily; e.g., 10028 would be 01 00 28 in BCD, and the middle 00 would trigger "end of string" so the 28 would be lost. However, since the digits A–F are never used in BCD, one could substitute A for 0; e.g., 10028 becomes 01 AA 28. Under this representation, however, it takes three bytes to send a two-byte number.

The preferred manner for encoding binary data in null-terminated strings is to use a very simplistic form of variable-length encoding where the two least-common bytes are expanded into two-byte strings, opening up one free value to map the null value to. For example, if hexadecimal AF and AE are the two least common bytes in the stream, one can map 00 to AF, AF to AE 01, and AE to AE 02.

Since more presentations will be much shorter than 9 hours in length, very high byte values will be less common. Even if the distribution were completely random, however, the average encoded length of the two-byte time-stamp value will be about 2.01 bytes, which is much better than the alternative strategies described above.

For example, the number 3, in raw form (that is, the computer's internal representation would be 00 03. The 00 byte would be interpreted by NetShow as an "end of string" character, so an empty string would arrive at the client. Encoded as explained above, it would instead be AF 03, which would be passed by NetShow appropriately as a two-character-long string. The client would then receive it and decode it to 00 03, which is the internal representation of the number 3. However, the number 44803 is AF 03 in internal form, and must accordingly be distinguishable from the number 3. The number 44803 is accordingly converted to AE 01 03, which NetShow sends as a 3-byte string. The client receives the string and decodes it to AF 03, or 44803.

Those skilled in the art will recognize that the foregoing discussion assumes a big-endian order, wherein the "most significant byte" comes first, as opposed to little-endian order, wherein the "least significant byte" comes first. For example, the number 259 is 0103 in hex. In big-endian order, this is made up of the two bytes 01 and 03 in that order; in little-endian, it is made up of 03 followed by 01. Some computers—such as Macintoshes currently use big-endian order, while other computers such as Windows/Intel machines use little-endian order internally. Therefore, a Windows/Intel computer's internal representation of 3 is 03 00 rather than 00 03. While the big-endian format is used for Internet software because it is the native "format of TCP/IP network protocol, it should be noted that the foregoing example accordingly assumed a particular format for the sake of explanation only.

Those skilled in the art will recognize that the foregoing methodology permits one to pre-record an interactive program in addition to broadcasting it live. The timing is embedded in the recorded video stream. A separate file is saved containing the time-stamped commands which the producer wishes to preserve. All commands will probably not be recorded; for example, a producer may not want to include old chat comments for a particular chat room to viewers watching off-line or in a rerun. In any event, the client's player receives and executes the signal from the pre-recorded show the same way as it receives and executes the signal from a live broadcast.

Moreover, the client's player can "fast forward" or rewind and repeat selected portions of the pre-recorded broadcast because the transmitted signal generates its own timeline. Because both the commands and the A/V stream are time-stamped, the viewer can skip or review any portion of the program content. The time-stamped commands, as well as the time-stamped A/V packets can be stored as files by the client, giving the viewer the option of viewing the program at his/her convenience.

Using the same "file server streaming" scheme used by web browsers like Netscape Navigator, video players like RealPlayer, music players like WinAmp, etc., the client player can simulate streaming when playing back archives by beginning playback while the files are still downloading. If the viewer wishes to follow in the normal sequence, the program will look the same as if watching live. If the viewer wants to pause, rewind, or fast-forward during playback, those features are still available. If the viewer fast-forwards ahead of the portion that has been downloaded at that point, the system will hold until the download catches up—similar to the buffering that takes place during a live broadcast.

Accordingly, the same program can even be re-broadcast periodically so that it can seen by viewers in different time zones at a reasonable time for them. Thus, instructional programs having national or international appeal can be viewed during normal hours regardless of the viewer's location.

While the foregoing description includes detail which will enable those skilled in the art to practice the invention, it should be recognized that the invention has been described in terms of the presently preferred embodiment and that the disclosure is not to be interpreted as limiting. Many modifications and variations will be apparent to those skilled in the art. It is accordingly intended that the invention herein be interpreted as covering all alterations and modifications as fall within the spirit and scope of the invention.

We claim:

1. A method of synchronizing broadcast program content and corresponding program commands of an Internet-Based broadcast, the method comprising the steps of:

generating a plurality of time-indicative index values during broadcast of an Internet-based program, associating each of the plurality of index values with respective commands in a command stream launched during broadcast of the program, transmitting the command stream and associated index values to one or more clients, associating each of the plurality of index values to respective video frames in a video stream of the program to indicate the relative time within the program at which the video frame occurs, wherein the index values are tagged to the video frames as script commands to be executed at the client, receiving the transmitted command stream and associated index values, storing a series of time-stamped commands, and using the index values in the video stream to determine the timing and sequence of execution of commands in the command stream at the one or more clients, by:

executing the script commands tagged to the video frames to obtain the index values;

retrieving the stored time-stamped commands associated with the retrieved index values;

retrieving any unexecuted time-stamped commands having a time-stamp earlier in time than the time-stamped commands associated with the retrieved index values; and executing the commands so that the unexecuted commands with time-stamps earlier in time are executed before the commands associated with the retrieved index values.

2. The method of claim 1, wherein the one or more clients execute commands arriving at a time after their time-stamp as soon as they are received.

3. The method of claim 1, wherein the index values are encoded prior to being tagged to the video frames.

4. The method of claim 3, wherein the index values are encoded by a variable length encoding scheme.

5. The method of claim 1, wherein the index values are incremented on a per second basis.

6. The method of claim 1, wherein the index values are incremented on a per half-second basis.

7. The method of claim 1, wherein the video stream is transmitted via UDP protocol to the one or more clients, and the command stream is transmitted via TCP protocol.

8. A system for synchronizing broadcast program content and corresponding program commands of a network-based broadcast, said system comprising:

a counter for generating a plurality of time-indicative index values during broadcast of an Internet-based program;

a first server for inputting the index values and for launching program commands to be executed during the broadcast, said server associating each of the plurality of index values with respective commands in a command stream launched during broadcast of the program, said first server transmitting the command stream and associated index values to one or more clients; and a second server for inputting the index values and associating each of the plurality of index values to video frames in a video stream of the program to indicate the relative time within the program at which the video frame occurs, wherein the index values are tagged to the video frames as a script command to be executed at the one or more clients, said second server transmitting the video stream and associated index values to the one or more clients, wherein the one or more clients receive the transmitted command stream and associated index values, store a series of time-stamped commands, execute the script commands tagged to the video frames to obtain the index values, retrieve the stored time-stamped commands associated with the retrieved index values, retrieve any unexecuted time-stamped commands having a time-stamp earlier in time than the time-stamped commands associated with the retrieved index values, and execute the commands so that the unexecuted commands with time-stamps earlier in time are executed before the commands associated with the retrieved index values.

9. The system of claim 8, further comprising an encoder, said encoder inputting the index values from said counter and sending the index values to said second server.

10. The system of claim 9, wherein the index values are encoded by said encoder prior to being sent to said second server.

11. The system of claim 9, wherein the index values are encoded by said encoder prior to being sent to said second server by a variable length encoding scheme.

12. The system of claim 8, wherein the index values are encoded by said second server prior to being tagged to the video frames.

13. The system of claim 8, wherein the index values are encoded by said second server prior to being tagged to the video frames by a variable length encoding scheme.

14. The system of claim 8, wherein said first server transmits the command stream and associated index values via a first protocol and the second server transmits the video stream and associated index values via a second protocol.

15. The system of claim 14, wherein said first protocol is TCP and the second protocol is UDP.

16. An article of manufacture comprising a machine-readable storage medium having stored therein indicia of a plurality of machine-executable control program steps, the control program comprising the steps of:

generating a plurality of time-indicative index values during broadcast of an Internet-based program;

associating each of the plurality of index values with respective commands in a command stream launched during broadcast of the program;

transmitting the command stream and associated index values to one or more clients;

associating each of the plurality of index values to respective video frames in a video stream of the program to indicate the relative time within the program at which the video frame occurs, wherein the index values are tagged to the video frames as script commands to be executed at the client;

receiving the transmitted command stream and associated index values;

storing a series of rime-stamped commands; and using the index values in the video stream to determine the timing and sequence of execution of commands in the command stream at the one or more clients, by:

executing the script commands tagged to the video frames to obtain the index values;

retrieving the stored time-stamped commands associated with the retrieved index values;

retrieving any unexecuted time-stamped commands having a time-stamp earlier in time than the time-stamped commands associated with the retrieved index values; and executing the commands so that the unexecuted commands with time-stamps earlier in time are executed before the commands associated with the retrieved index values.

17. The article of manufacture of claim 16, wherein the one or more clients execute commands arriving at a time after their time-stamp as soon as they are received.

18. The article of manufacture of claim 16, wherein the index values are encoded prior to being tagged to the video frames.

19. The article of manufacture of claim 18, wherein the index values are encoded by a variable length encoding scheme.

20. The article of manufacture of claim 16, wherein the video stream is transmitted via UDP protocol to the one or more clients, and the command stream is transmitted via TCP protocol.

* * * * *